(12) United States Patent
Asplund et al.

(10) Patent No.: US 10,432,278 B2
(45) Date of Patent: Oct. 1, 2019

(54) FIRST COMMUNICATION DEVICE AND METHODS PERFORMED THEREBY FOR MANAGING BEAMFORMING BY A SECOND COMMUNICATION DEVICE FOR TRANSMISSION OF A SIGNAL

(71) Applicant: Telefonaktiebolaget LM Ericsson (Publ), Stockholm (SE)

(72) Inventors: Henrik Asplund, Stockholm (SE); Anders Furuskär, Stockholm (SE); Eliane Semaan, Sundbyberg (SE); Gustav Larson, Solna (SE); Patrik Persson, Saltsjö-Boo (SE); Björn Thors, Täby (SE); Christer Törnevik, Solna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 15/577,614

(22) PCT Filed: May 18, 2016

(86) PCT No.: PCT/EP2016/061089
§ 371 (c)(1),
(2) Date: Nov. 28, 2017

(87) PCT Pub. No.: WO2017/198293
PCT Pub. Date: Nov. 23, 2017

(65) Prior Publication Data
US 2018/0138958 A1    May 17, 2018

(51) Int. Cl.
*H04B 7/185* (2006.01)
*H04B 7/06* (2006.01)
(Continued)

(52) U.S. Cl.
CPC .......... *H04B 7/0617* (2013.01); *H04B 17/11* (2015.01); *H04W 72/046* (2013.01); *H04W 88/08* (2013.01)

(58) Field of Classification Search
CPC ... H04B 7/0617; H04B 17/11; H04W 72/046; H04W 88/08
See application file for complete search history.

(56) References Cited

U.S. PATENT DOCUMENTS

| 8,630,596 B2 | 1/2014 | Harel et al. |
| 2003/0171131 A1 | 9/2003 | Kettering et al. |

(Continued)

FOREIGN PATENT DOCUMENTS

| EP | 2179609 A1 | 4/2010 |
| WO | PCT/IN2011/000641 | 8/2014 |

OTHER PUBLICATIONS

International Search Report and Written Opinion of the International Searching Authority dated Feb. 3, 2017 in corresponding PCT Application Serial No. PCT/EP2016/061089, consisting of 10 pages.
(Continued)

*Primary Examiner* — Dac V Ha
(74) *Attorney, Agent, or Firm* — Christopher & Weisberg, P.A.

(57) ABSTRACT

A method performed by a first communication device for managing beamforming by a second communication device for transmission of a signal. The first and second communication devices operate in a wireless communications network having a zone in which a radio frequency electromagnetic field strength is required by a regulation to be below a threshold. The first communication device adjusts at least one of an output power and a beam shape in the beamforming. The adjusting is such that the radio frequency electromagnetic field strength in the zone for the output power and the beam shape in the beamforming is below the threshold.

(Continued)

The first communication device initiates transmission of the signal to a third communication device operating in the wireless communications network using beamforming with the adjusted at least one of the output power and the beam shape.

20 Claims, 5 Drawing Sheets

(51) Int. Cl.
*H04B 17/11* (2015.01)
*H04W 72/04* (2009.01)
*H04W 88/08* (2009.01)

(56) References Cited

U.S. PATENT DOCUMENTS

| | | | | |
|---|---|---|---|---|
| 2004/0224637 | A1* | 11/2004 | Silva | H04B 7/04 455/63.4 |
| 2014/0105054 | A1* | 4/2014 | Sægrov | H01Q 3/2605 370/252 |
| 2015/0341800 | A1* | 11/2015 | Campos | H04W 16/28 375/267 |
| 2016/0013848 | A1* | 1/2016 | Wernersson | H04B 7/0617 370/329 |
| 2016/0278063 | A1* | 9/2016 | Zhang | H04W 72/046 |
| 2018/0160377 | A1* | 6/2018 | Abramsky | H04B 7/0617 |
| 2018/0166779 | A1* | 6/2018 | Feria | H04B 7/18506 |
| 2019/0007889 | A1* | 1/2019 | Jayawickrama | H04W 16/14 |

OTHER PUBLICATIONS

Official Journal of the European Communities: Council Recommendation of Jul. 12, 1999 on the Limitation of Exposure of the General Public to Electromagnetic Fields (0 Hz to 300 GHz); consisting of 13 pages.

International Electrotechnical Commission, IEC 62232: International Standard, Norme Internationale; Edition 1.0, May 2011; Determination of RF Field Strength and SAR in the Vicinity of Radiocommunication Base Stations for the Purpose of Evaluating Human Exposure, consisting of 22 pages.

ICNIRP Guidelines: International Commission on Non-Ionizing Radiation Protection; Guidelines for Limiting Exposure to Time-Varying Electric, Magnetic, and Electromagnetic Fields (Up to 300 GHz); copyright Apr. 1998 Health Physics Society, vol. 74, pp. 494-522, consisting of 18 pages.

EESTI Standard EVS-EN 50400:2006; Basic Standard to Demonstrate the Compliance of Fixed Equipment for Radio Transmission (110 MHz-40 GHz) Intended for Use in Wireless Telecommunication Networks with the Basic Restrictions or the Reference Levels Related to General Public Exposure to Radio Frequency Electromagnetic Fields, When Put into Service; CENELEC Jun. 2006, consisting of 9 pages.

* cited by examiner

FIRST COMMUNICATION DEVICE AND METHODS PERFORMED THEREBY FOR MANAGING BEAMFORMING BY A SECOND COMMUNICATION DEVICE FOR TRANSMISSION OF A SIGNAL

CROSS-REFERENCE TO RELATED APPLICATIONS

This application is a Submission Under 35 U.S.C. § 371 for U.S. National Stage Patent Application of International Application No: PCT/EP2016/061089, filed May 18, 2016 entitled "FIRST COMMUNICATION DEVICE AND METHODS PERFORMED THEREBY FOR MANAGING BEAMFORMING BY A SECOND COMMUNICATION DEVICE FOR TRANSMISSION OF A SIGNAL" which is incorporated herein by reference.

TECHNICAL FIELD

The present disclosure relates generally to a first communication device and methods performed thereby for managing beamforming by a second communication device for transmission of a signal. The present disclosure also relates generally to a computer program product, comprising instructions to carry out the actions described herein, as performed by the first communication device. The computer program product may be stored on a computer-readable storage medium.

BACKGROUND

Communication devices such as wireless devices are also known as e.g. User Equipments (UE), mobile terminals, wireless terminals and/or Mobile Stations (MS). Wireless devices are enabled to communicate wirelessly in a cellular communications network or wireless communication network, sometimes also referred to as a cellular radio system, cellular system, or cellular network. The communication may be performed e.g. between two wireless devices, between a wireless device and a regular telephone and/or between a wireless device and a server via a Radio Access Network (RAN) and possibly one or more core networks, comprised within the wireless communications network.

Wireless devices may further be referred to as mobile telephones, cellular telephones, laptops, or tablets with wireless capability, just to mention some further examples. The wireless devices in the present context may be, for example, portable, pocket-storable, hand-held, computer-comprised, or vehicle-mounted mobile devices, enabled to communicate voice and/or data, via the RAN, with another entity, such as another terminal or a server.

The wireless communications network covers a geographical area which may be divided into cell areas, each cell area being served by an access node such as a base station, e.g. a Radio Base Station (RBS), which sometimes may be referred to as e.g., evolved Node B ("eNB"), "eNodeB", "NodeB", "B node", or BTS (Base Transceiver Station), depending on the technology and terminology used. The base stations may be of different classes such as e.g. Wide Area Base Stations, Medium Range Base Stations, Local Area Base Stations and Home Base Stations, based on transmission power and thereby also cell size. A cell is the geographical area where radio coverage is provided by the base station at a base station site. One base station, situated on the base station site, may serve one or several cells. Further, each base station may support one or several communication technologies. The base stations communicate over the air interface operating on radio frequencies with the terminals within range of the base stations. In the context of this disclosure, the expression Downlink (DL) is used for the transmission path from the base station to the wireless device. The expression Uplink (UL) is used for the transmission path in the opposite direction i.e. from the wireless device to the base station.

In 3rd Generation Partnership Project (3GPP) Long Term Evolution (LTE), base stations, which may be referred to as eNodeBs or even eNBs, may be directly connected to one or more core networks.

3GPP LTE radio access standard has been written in order to support high bitrates and low latency both for uplink and downlink traffic. All data transmission is in LTE controlled by the radio base station.

Radio transmitters may emit Radio Frequency (RF) electromagnetic fields. A Radio Frequency (RF) ElectroMagnetic Field (RF EMF) may be understood as a physical field consisting of electric and magnetic field components produced by accelerating electrical charges. The electromagnetic energy propagates as waves where a changing electric field gives rise to a magnetic field and vice versa. The electromagnetic field strength may be understood as a magnitude of an electromagnetic field vector. With knowledge of the RF EMF, power density and Specific Absorption Rate may be determined. The field strength levels resulting from the RF EMF that may be emitted by radio transmitters, such as Radio Base Stations (RBS), may need to be controlled and maintained below certain limit values in different regions of space to comply with a regulation, that is, a law, policy or standard, for example. The regulation may be set due to various reasons.

One of the reasons is human safety. Human exposure to RF EMF may be subject to national and international regulations and standards, which in many countries may be based on recommendations from the World Health Organization (WHO) and the International Commission on Non-Ionizing Radiation Protection (ICNIRP) [1]. One example of a regulation is found in Europe, where maximum RF exposure levels are specified in the Council Recommendation 1999/519/EC [2]. The ICNIRP guidelines specify basic restrictions and reference levels for occupational and general public exposure. In the frequency range of interest for existing mobile communication systems, the basic restrictions are expressed in terms of Specific Absorption Rate (SAR) and the reference levels as limits on electric and magnetic field strength or power density. SAR in watts/kilogram (W/kg) is a measure of the rate of RF energy absorption in tissue. For future 5G mobile communication systems, the use of higher frequency bands is of interest. Below 10 GHz, for ICNIRP, the basic restriction is specified in terms of SAR, as a quantity measured inside the body. As the frequency increases, the energy absorption in the human tissue becomes more superficial, and above 10 Gigahertz (GHz), the ICNIRP basic restrictions change from SAR to incident power density [1], that is, to a quantity measured without the body present.

RF EMF exposure assessments may be conducted with the purpose to make sure that the exposure levels from the considered Equipment Under Test (EUT) may not exceed the relevant limits in areas accessible to workers and members of the general public.

Before an RBS product may be placed on the market, an RF EMF product compliance assessment may be conducted, where a compliance boundary may be determined outside of which the exposure is below the exposure limits. These compliance boundaries may be determined using either calculations or measurements as if the products are transmitting in free space. For products using external antennas, the RF EMF compliance assessment may be normally conducted for a typical antenna. For products with internal antennas, the entire EUT may be considered for the exposure assessment. The size and shape of the compliance boundary depend on the output power and the EUT/antenna geometry, including material properties. The compliance boundary may be usually described with a simpler shape such as a rectangular box or a cylinder enclosing the EUT/antenna.

Operators putting an RBS into service may be required to conduct an RF EMF product installation compliance assessment. The main difference compared with the product compliance assessment is that contributions from possible ambient sources and/or the effect of scatterers may need to be considered. Methods for how to approximately consider effect of scatterers, and exposure levels above which contributions from ambient sources may need to be considered, have been standardized [3], [4].

For mobile terminals, there are currently methods aimed to direct a signal away from the body and keep RF exposure below established SAR limits. In one example this is based on sensing the reflected power in the antenna [6]. This is possible when the terminal is very close to the human body. In another example [5] directing a signal away from the body and keeping an RF exposure below established SAR limits is based on sensing the proximity of the user to the terminal or on sensing how the terminal is held, and subsequently directing the emission away from the user.

Another reason for why RF EMF levels may need to be controlled and maintained below certain limit values may be when the radio transmitters may be used in environments containing sensitive electrical or electronic equipment. This may e.g., include intensive care departments in hospitals or nuclear power plants with strict requirements on Electro-Magnetic Compatibility (EMC). Also for this case, compliance boundaries may be determined but instead using limits of relevance for EMC applications, e.g., the generic electric field strength immunity limit of 3 voltmeter (V/m).

Current wireless standards support multi-antenna transmission for beamforming, diversity, and spatial multiplexing through different precoding schemes. Beamforming may be understood as a signal processing technique for directional signal transmission or reception using antenna arrays. This may be achieved by multiplying the signals associated with each antenna element in the array with complex values (weights) to make the transmission/reception at particular angles experience constructive interference while others experience destructive interference. In closed-loop precoding, candidate beam shapes may be evaluated by a receiver based on reference signal transmissions. The candidate beam shapes may be available as a pre-agreed codebook of transmit antenna weights to be applied on different transmit antenna elements. The receiver may select a preferred codebook entry, and hence one or several beam shapes, and report this to the transmitter for use in data transmissions. There exists functionality where the transmitter may restrict the receiver to only consider a subset of the available beam shapes. Other precoding schemes such as e.g. reciprocity-based beamforming may allow much greater flexibility of the possible beam shapes.

Typically, the compliance boundary determined as indicated above may be understood as a fixed zone surrounding the EUT/antenna. To account for beamforming, where very high antenna gains may be achievable, a conservative scenario is normally used in existing methods, where the compliance boundary is made large enough to ensure that EMF levels are below the relevant limits on RF exposure or EMC for all possible antenna weights. This may lead to very large compliance distances which may hinder the use of beamforming or make it difficult to install the RBS product at the desired location.

There are other methods available to direct the beamforming away from any human presence or alternatively to reduce the output power in, typically used for mobile terminals. For a person skilled in the art, it may also be possible to use the same methods for radio base stations. The existing methods are based on sensors which will suffer from detection and reliability errors and may further require constant monitoring of the surroundings of the antenna. Many of the sensor types such as proximity sensors or reflected power sensors are also unsuitable to detect the presence of humans at larger distances such as relevant for an access point installation. The efficiency of such methods as in [5] and [6] are also difficult to assess in measurements or numerical calculations and hence they may not be sufficient to allow relaxation of the compliance distance in certain directions.

In summary, given the limits on radio frequency electromagnetic field strength set by regulations, the use of communication devices with existing methods is limited.

SUMMARY

It is an object of embodiments herein to improve the management of beamforming by communication devices in a wireless communications network.

According to a first aspect of embodiments herein, the object is achieved by a method performed by a first communication device. The method is for managing beamforming by a second communication device for transmission of a signal. The first communication device and the second communication device operate in a wireless communications network. The wireless communications network comprises a zone wherein a radio frequency electromagnetic field strength is required by a regulation to be below a threshold. The first communication device adjusts at least one of: an output power and a beam shape in the beamforming. The adjusting is such that the radio frequency electromagnetic field strength in the zone for the output power and the beam shape in the beamforming is below the threshold. The first communication device initiates transmission of the signal to a third communication device operating in the wireless communications network, using beamforming with the adjusted at least one of: output power and beam shape.

According to a second aspect of embodiments herein, the object is achieved by the first communication device configured to manage beamforming configured to be used by the second communication device for transmission of the signal. The first communication device and the second communication device are configured to operate in the wireless communications network. The wireless communications network comprises a zone wherein a radio frequency electromagnetic field strength is required by a regulation to be below a threshold. The first communication device is configured to adjust at least one of: the output power and the beam shape in the beamforming configured to be used. To adjust is configured to be such that the radio frequency electromagnetic field strength in the zone for the output power and the beam shape in the beamforming is below the threshold. The first communication device is further configured to initiate transmission of the signal to a third communication device configured to operate in the wireless communications network, using beamforming with the adjusted at least one of: output power and beam shape.

According to a third aspect of embodiments herein, the object is achieved by a computer program. The computer program comprises instructions which, when executed on at least one processor, cause the at least one processor to carry out the method according to embodiments herein.

According to a fourth aspect of embodiments herein, the object is achieved by computer-readable storage medium. The computer-readable storage medium has stored thereon a computer program comprising instructions which, when executed on at least one processor, cause the at least one processor to carry out the method according to embodiments herein.

By the first communication device adjusting the output power and/or the beam shape in the beamforming to be used by the second communication device, the radio frequency electromagnetic field strength in the zone resulting from transmitting the signal with the adjusted output power and/or beam shape, is kept below the threshold, and therefore compliant with the regulation.

In consequence, embodiments herein allow greater freedom in deployment of RBS by ensuring that the RF EMF levels are below relevant limits in certain areas where restrictions on said levels may apply. Installation locations which would be unavailable with a general, non-site specific, compliance boundary may now be used according to the embodiments herein. Furthermore, embodiments herein do not require configuration changes in the devices which may receive the transmitted signals.

BRIEF DESCRIPTION OF THE DRAWINGS

Examples of embodiments herein are described in more detail with reference to the accompanying drawings, in which.

DETAILED DESCRIPTION

Embodiments will now be described more fully hereinafter with reference to the accompanying drawings, in which examples of the claimed subject matter are shown. The claimed subject matter may, however, be embodied in many different forms and should not be construed as limited to the embodiments set forth herein. Rather, these embodiments are provided so that this disclosure will be thorough and complete, and will fully convey the scope of the claimed subject matter to those skilled in the art. It should also be noted that these embodiments are not mutually exclusive. Components from one embodiment may be tacitly assumed to be present/used in another embodiment.

Figure 1A:
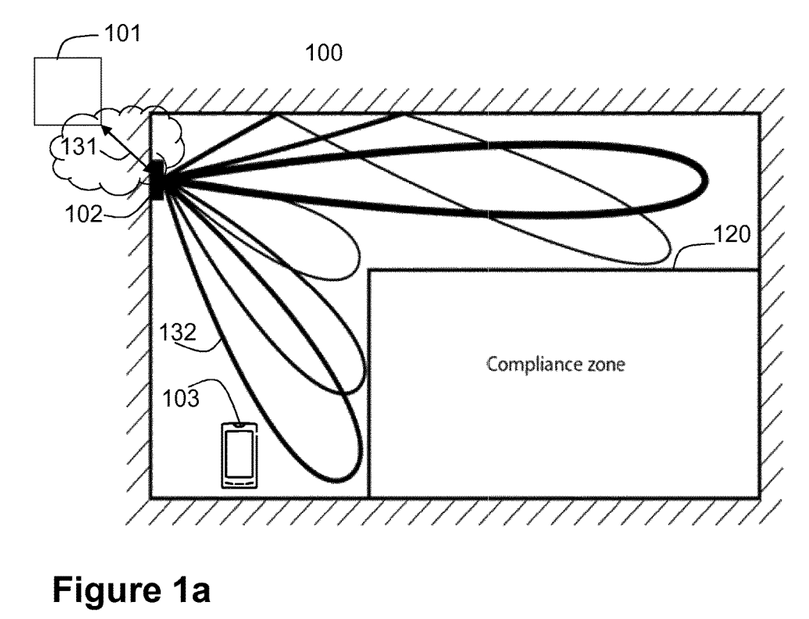
FIG. 1a is a schematic diagram illustrating a non-limiting example of a wireless communications network, according to some embodiments.
Figure 1B:
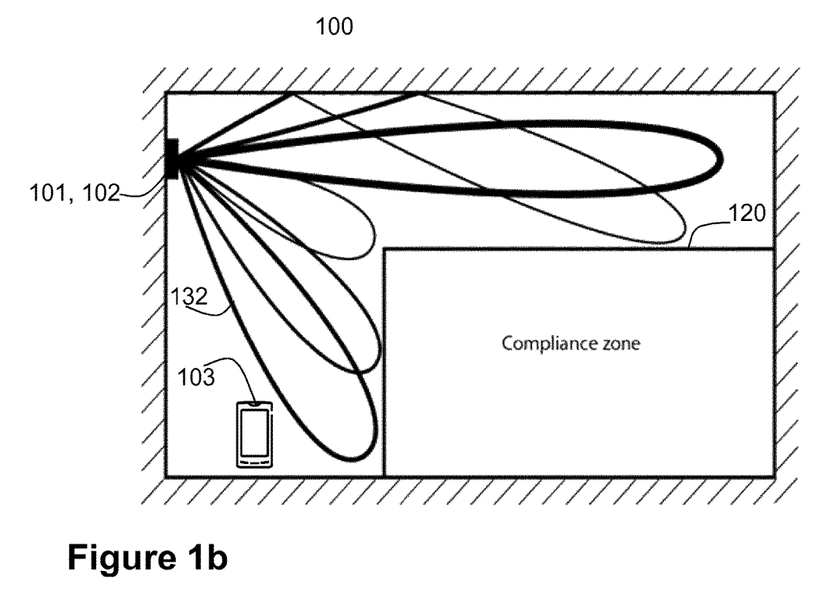
FIG. 1b is a schematic diagram illustrating a non-limiting example of a wireless communications network, according to some embodiments.

FIG. 1a and FIG. 1b each depict an example of a wireless communications network 100, sometimes also referred to as a radio system, radio network or wireless communications system, in which embodiments herein may be implemented. The wireless communications network 100 may for example be a network such as Long-Term Evolution (LTE), e.g. LTE Frequency Division Duplex (FDD), LTE Time Division Duplex (TDD), LTE Half-Duplex Frequency Division Duplex (HD-FDD), LTE operating in an unlicensed band, or a Wideband Code Division Multiple Access (WCDMA), Universal Terrestrial Radio Access (UTRA) TDD, Ultra-Mobile Broadband (UMB), Global System for Mobile communications (GSM) network, GSM/Enhanced Data Rate for GSM Evolution (EDGE) Radio Access Network (GERAN) network, EDGE network, a network comprising of any combination of Radio Access Technologies (RATs) such as e.g. Multi-Standard Radio (MSR) base stations, multi-RAT base stations etc., any 3rd Generation Partnership Project (3GPP) network, WiFi network, Worldwide Interoperability for Microwave Access (WiMax), 5G system or any wireless network or system. Thus, although terminology from LTE may be used in this disclosure to exemplify embodiments herein, this should not be seen as limiting the scope of the embodiments herein to only the aforementioned system. Other wireless systems may also benefit from exploiting the ideas covered within this disclosure. Thus, note that terminology such as eNodeB and UE should be considering non-limiting.

The wireless communications network 100 comprises a plurality of communication devices whereof a first communication device 101, a second communication device 102, and a third communication device 103 are depicted in FIG. 1a. The first communication device 101 is a network node controlling the actions of the second communication device 102, which is a radio network node as described below. In some non-limiting examples, such as that depicted in the non-limiting example of FIG. 1a, the first communication device 101 and the second communication device 102 may be implemented in a so-called cloud solution, where the first communication device 101 may be a so-called virtual node or virtual machine controlling the actions of the second communication device 102. The first communication device 101 may also have in a so-called distributed implementation, wherein the actions described herein as being performed by the first communication device 101 may actually be performed by one or more processors from different nodes communicating in the cloud. In other examples, the first communication device 101 may be, e.g., a core network node, such as, e.g., Mobility Management Entity (MME), Self-Optimizing/Organizing Network (SON) node, a coordinating node, positioning node, Minimization of Drive Test (MDT) node, etc . . . .

In some other embodiments, as shown in FIG. 1b, the first communication device 101 may be the same as the second communication device 102, in which case the first communication device 101 and the second communication device 102 may be a same radio network node.

The wireless communications network 100 comprises a plurality of radio network nodes whereof the second communication device 102 is depicted in FIGS. 1a and 1b. The second communication device 102 is a radio network node with beamforming capability. In some embodiments, the radio network node may be a base station, such as e.g., an eNB, eNodeB, or a Home Node B, a Home eNodeB, femto Base Station, BS, Transmission Point, Radio Access Point, Remote Radio Unit (RRU), Remote Radio Head (RRH), or any other network unit capable to serve a wireless device or a machine type communication device in the wireless communications network 100 using beamforming. In such embodiments, the second communication device 102 may be e.g., a Wide Area Base Station, Medium Range Base Station, Local Area Base Station and Home Base Station, based on transmission power and thereby also coverage size. The second communication device 102 may be a stationary relay node or a mobile relay node. The second communication device 102 may support one or several communication technologies, and their name may depend on the technology and terminology used. The second communication device 102 may serve receiving nodes such as the third communication device 103, with serving beams.

In other embodiments, the radio network node with beamforming capability may be a wireless device. A wireless device, such as a UE, may be also known as e.g. mobile terminal, wireless terminal and/or mobile station, mobile telephone, cellular telephone, or laptop with wireless capability, just to mention some further examples. The wireless device in the present context may be, for example, portable, pocket-storable, hand-held, computer-comprised, or a vehicle-mounted mobile device, enabled to communicate voice and/or data, via a RAN, with another entity, such as a server, a laptop, a Personal Digital Assistant (PDA), or a tablet computer, sometimes referred to as a tablet with wireless capability, a Machine-to-Machine (M2M) device, a device equipped with a wireless interface, such as a printer or a file storage device, modem, Laptop Embedded Equipped (LEE), Laptop Mounted Equipment (LME), USB dongles, Customer Premises Equipment (CPE) or any other radio network unit capable of communicating over a radio link in a wireless communications network 100. The wireless device may be wireless, i.e., it may be enabled to communicate wirelessly in the wireless communication network 100. The communication may be performed e.g., between two devices, between a device and a regular telephone and/or between a device and a server. The communication may be performed e.g., via a RAN and possibly one or more core networks, comprised within the wireless communications network 100.

A number of wireless devices may be located in the wireless communications network 100. In the example scenario of FIGS. 1 and 1b, only one wireless device is shown: the third communication device 103. The third communication device 103 may be a wireless communication device, as just described.

The wireless communications network 100 comprises a zone 120, which may also be referred to herein as a compliance zone 120. The zone 120 may be understood as a two-dimensional area or a three-dimensional volume where a radio frequency electromagnetic field strength is subject to a regulation. That is, the RF exposure limits or EMC limits, as they may be set by the regulation, must be fulfilled within the zone 120. The zone 120 may be defined at production, that is, by factory settings, at installation, and/or during operation, according to different embodiments herein. At installation, the installation technician may physically measure or estimate the dimensions of the zone 120, and make these available to the first communication device 101, e.g. to a network operating center, or to the second communication device 102. Alternatively, the compliance zone 120 may be estimated using sensor input, e.g. video images or similar, as known in the art. This estimation may also take into account an effect of significant reflectors, which, if not considered, may result in RF EMF levels above the regulation limits inside the zone 120. During operation, a boundary of the zone 120 may be updated following changes in the regulation, access of humans to the vicinity of the second communication device 102, or orientation of the second communication device 102. Such changes may necessitate a message being passed to the first communication device 101 or the second communication device 102 defining the new compliance zone 120. As non-limiting examples of the zone 120, for an RF EMF exposure assessment, the zone 120 may correspond to the area outside of the compliance boundary, as described earlier. For an EMC application, the zone 120 may correspond to a room with sensitive equipment.

The first communication device 101 may communicate with the second communication device 102 over a first link 131, which may be a radio link or a wired link. The second communication device 102 may communicate with the third communication device 103 over a second link 132, which may be a radio link.

Any reference herein to the terms "first", "second" or "third" will be understood to refer a manner of distinguishing between different instances of the terms they may modify. "First", "second", or "third" are not intended to confer a cumulative or chronological meaning to the terms they modify.

In this section, the embodiments herein will be illustrated in more detail by a number of exemplary embodiments. It should be noted that these embodiments are not mutually exclusive. Components from one embodiment may be tacitly assumed to be present in another embodiment and it will be obvious to a person skilled in the art how those components may be used in the other exemplary embodiments.

Embodiments herein may be understood to relate to ensuring compliance with RF EMF exposure or EMC limits for products employing beamforming technologies. Although terminologies such as "SAR", "RF exposure limits", "RF field strength limits", "EMC limits" and "Human presence" have been used in this disclosure, this should not be seen as limiting the scope of the invention to only the aforementioned limits and exposed individuals. In general "Human presence" may be considered as the exposed individuals and "SAR", "RF exposure limits", "EMC limits" as a threshold, e.g., a value or limit to be fulfilled according to the regulation. Hence, other radio transmitters and receivers with a certain threshold to fulfill may also benefit from exploiting the embodiments covered within this disclosure.

Figure 2:
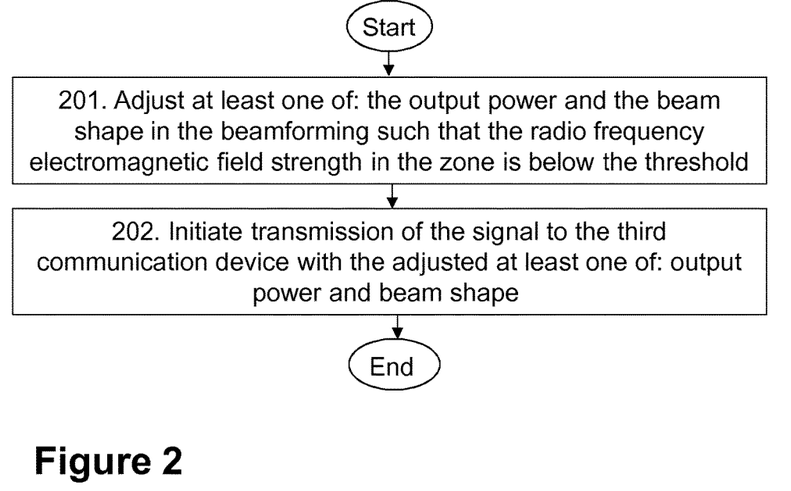
FIG. 2 is a schematic flowchart illustrating a method in a first communication device, according to some embodiments.

Embodiments of a method performed by the first communication device 101 for managing beamforming by the second communication device 102 for transmission of a signal, will now be described with reference to the flowchart depicted in FIG. 2. As mentioned earlier, the first communication device 101 and the second communication device 102 operate in the wireless communications network 100. The wireless communications network 100 comprises the zone 120, wherein a radio frequency electromagnetic field strength is required by the regulation to be below a threshold. The threshold may be understood as a limit applicable by the regulation used.

In some embodiments, the radio frequency electromagnetic field strength in the zone 120 may be required by the regulation to always be below the threshold. In such embodiments, the threshold may be a value that may never be surpassed. This may be the case, for example when the threshold may be for EMC applications. In other embodiments, the regulation may require the radio frequency electromagnetic field strength in the zone 120, when averaged over a time period, to be below the threshold. In such embodiments, the threshold may be a value that may not be surpassed over the time period, as specified in the regulation. This may be the case, for example, when the threshold may be for RF EMF exposure assessments.

The signal may be understood herein as a radio signal. The signal may be, e.g., a data transmission signal dedicated to a particular receiver such as the third communication device 103, a data transmission signal broadcast to multiple receivers comprising the third communication device 103, a control information signal dedicated to the third communication device 103 or several receivers, a general system information signal, or any combination of the above.

The method comprises the following actions.

Action 201

To secure the future of mobile systems, a much denser deployment of radio base stations may be expected, both indoor and outdoor. To even further boost the performance, beamforming may be one technique to be used. When using beamforming, however, very high antenna gains may be achievable which may restrict the possibilities to deploy a radio base station where wanted, while at the same time not exceeding the threshold or limit set by a regulation on the RF EMF levels in certain areas, where for various reasons restrictions on the RF EMF levels may apply. Such an area may be e.g., the zone 120 described earlier.

Instead of seeing beamforming as a problem, embodiments herein allow to use beamforming as an enabler to actually deploy radio base stations such as the second communication device 102 where wanted, while at the same time maintaining the RF EMF levels in certain areas at or below a required limit.

By defining the zone 120, that is, a compliance zone where the RF exposure limits or EMC limits must be fulfilled, it may be possible to adjust the shape and/or power of a beam in the second communication device 102 to ensure that the installation fulfills all requirements needed to comply with the regulation dictating the threshold or limit.

At some point, it may be desired to use another beam to achieve better performance from a communication point of view. This may happen, for example, when the second communication device 102 may use 'multiple fixed beams' once at 'power on', whereas when the second communication device 102 may use flexible beams, it may be repeated based on reception of new measurements, e.g., of the channel to the third communication device 103. For the purpose to use another beam, the first communication device 101 may consider using at least one of: an output power and a beam shape in the beamforming by the second communication device 102. The output power and the beam shape may be a desired output power and a desired beam shape to be used in the beamforming by the second communication device 102 to e.g., obtain a better performance from a communication point of view. The output power may be understood to refer to a power available from a generator in the second communication device 102, for a beam pattern. The beam shape may be understood as a resulting radiation pattern of an antenna used by the second communication device 102 for the transmission of the signal, and antenna weights. An antenna weight may be understood as an amplitude and phase adjustment of a signal sent from an antenna. An array antenna may comprise several antenna elements, for which different weights may be used.

In this Action, the first communication device 101 adjusts at least one of: the output power and the beam shape in the beamforming by the second communication device 102. The adjusting is such that the radio frequency electromagnetic field strength in the zone 120 for the output power and the beam shape in the beamforming is below the threshold.

Adjusting may be understood as changing the desired output power and the desired beam shape so that, when used in the beamforming by the second communication device 102, they result in a radio frequency electromagnetic field strength in the zone 120 that is below the threshold, and therefore, compliant with the regulation. Adjusting may also be understood as changing the desired output power and the desired beam shape until they result in an estimated radio frequency electromagnetic field strength in the zone 120 that is below the threshold, and therefore, if used by the second communication device 102, would be compliant with the regulation. In other words, the first communication device 101 adjusts the output power and/or the beam shapes that may be used for beamforming by the second communication device 102 so that the RF EMF levels in the zone 120 once the signal is transmitted are at or below the threshold. The adjusting may also comprise determining, estimating or calculating whether the radio frequency electromagnetic field strength in the zone 120 that would result from using the output power and or the beam shape would be below the threshold.

The radio frequency electromagnetic field strength may be understood as described above. The radio frequency electromagnetic field strength in the zone may depend on both, beamformed signals and non-beamformed signals, originating simultaneously from the second communication device 102. Examples of beamformed signals may be data transmission. Examples of non-beamformed signals may be control channel transmissions including reference signals for channel estimation.

The regulation may be a law, policy, standard, etc . . . as described earlier. Examples of a regulation may be that concerning RF exposure limits for human safety, or concerning requirements on ElectroMagnetic Compatibility (EMC), as discussed earlier.

The adjusting may be performed based on an obtained determination that an adjustment of the output power or the beam shape is necessary.

The beam shape adjustment may be carried out by the first communication device 101 by selecting a different weight vector than one that may be currently used. This may change the directivity of beams that may be transmitted either directly, or indirectly via reflections, in one or more directions towards the zone 120.

It will be understood that in the embodiments wherein the first communication device 101 is a different node than second communication device 102, as shown in FIG. 1*a*, the adjusting of this Action 202 may be performed by sending a message to the second communication device 102, via e.g., the first link 131. The message may comprise an indication on how to perform the adjustment.

As stated earlier, during operation, the boundary of the zone 120 may be updated following changes in the regulation, access of humans to the vicinity of the second communication device 102, or orientation of the second communication device 102. That is, a dimension of the zone 120 may be updated. In such cases, the update of the dimension of the zone 120 may be obtained by the first communication device 101 by receiving a message from another communication device in the wireless communications network 100. The message may comprise an indication of such an update.

Hence, in some embodiments, the adjusting of this Action 202 may be performed based on an obtained update of the dimension of the zone 120.

The adjusting is performed prior to the second communication device 102 using the output power and the beam shape in the beamforming. Therefore, the second communication device 102, when using the output power and the beam shape is compliant with the regulation.

In some embodiments, the adjusting in this Action may be performed based on one of: a) a look-up table comprising a finite set of weights, and b) a certain antenna weight vector and corresponding output power.

In beamforming, transmission of a signal may be performed over multiple antenna elements by applying an individual weight, that is, an excitation, to each of these antenna elements. Each weight may be understood to define a magnitude and a phase of the RF EMF transmitted by each antenna element. A weight vector may be understood to represent a specific excitation of all the antenna elements in the array. A finite set of weight vectors may be understood as a countable number of pre-defined antenna array excitations. A look-up table specified for a finite set of weight vectors may be understood as a table of pre-calculated values, wherein by inputting a specific weight vector for transmission of the signal from the second communication device 102, an output value may be obtained of the radio frequency electromagnetic field strength that would result in the zone 120.

Hence, in some embodiments wherein the obtaining the determination may be performed based on the look-up table. The adjusting may have been performed by checking the output value for the radio frequency electromagnetic field strength that would result in the zone 120 for a specific weight vector for transmission of the signal from the second communication device 102. In other embodiments, the adjusting may have been performed based on a lookup-table that may directly provide a maximum output power that may be used, e.g., by the second communication device 102, with a specific weight vector. Yet in other embodiments, the adjusting may have been performed for a certain antenna weight vector and corresponding output power, that is, by making a whole calculation without using pre-calculated values, e.g., without using a look-up table. This may be useful in a scenario where a set of pre-defined weight vectors may not be used by the second communication device (102). For example, the first communication device 101 may estimate the radio frequency electromagnetic field strength on a boundary to the zone 120 for different power settings and beam shapes. This estimate may be conservatively calculated according to standardized procedures for exposure assessments and if relevant also considering effects of ambient sources and the environment [3], [4].

As mentioned earlier, in some embodiments, the threshold is a value that may not be surpassed over the time period, as specified in the regulation. In such embodiments, the adjusting may be based on a determination of whether the radio frequency electromagnetic field strength in the zone 120 would be below the threshold over a period of time. In other words, the power and beamforming control may or may not also consider the time of exposure. In some cases, as it may be permitted by the regulation, the relevant limits may be taken as an average over a certain period of time, thereby allowing during a shorter period of time RF EMF levels above the threshold, as long as the time-average is below the threshold, that is, the limit set by the regulation. In other cases, such as emergency situations, it may be permitted by the regulation to exceed the RF EMF levels in order to maintain connectivity even if the RF EMF levels are exceeded. Therefore, in some embodiments, the radio frequency electromagnetic field strength may be averaged over a time period. An exception may be for EMC applications, where no time-averaging may apply. The threshold may therefore be understood as a limit, with or without an averaging time as applicable by the regulation used.

It will also be understood that the adjusting such that the radio frequency electromagnetic field strength in the zone 120 for the output power and the beam shape in the beamforming is below the threshold may be implemented so that the radio frequency electromagnetic field strength in the zone 120 is below or equal to a value related to the threshold or limit, or indirectly so that the electromagnetic field strength in the zone 120 is not above the threshold. Other variants will also be understood by one of skill in the art to be comprised in this Action.

That the zone 120 and the threshold are based on a compliance with the regulation may be understood as that the regulation may dictate or establish in what area, volume, space, room, etc, the radio frequency electromagnetic field strength may need to be kept under which value.

In some embodiments, the zone 120 may be pre-configured, that is, it may have fixed dimensions based on the regulation. In other embodiments, the zone 120 may be estimated by the first communication device 101 based on sensor input. For example, in examples wherein the second communication device 102 may be mounted on a wall of a city building, the sensor may measure the distance to a building on the opposite side of the street.

Action 202

In this action, the first communication device 101 initiates transmission of the signal to the third communication device 103 operating in the wireless communications network 100 using beamforming with the adjusted at least one of: output power and beam shape. The adjusted output power and/or beam shape are the result of performing Action 201.

Because in some embodiments the first communication device 101 may be a different node than second communication device 102, as shown in FIG. 1a, the initiating transmission of this Action 203 may be performed by sending an instruction, via e.g., the first link 131, to the second communication device 102 to start transmitting the signal to the third communication device 103, or simply by triggering the transmission of the signal, in an indirect way.

In the embodiments wherein the first communication device 101 is the same as the second communication device 102, the initiating of the transmission may be implemented by starting the transmission of the signal.

This action is optional.

Figure 3:
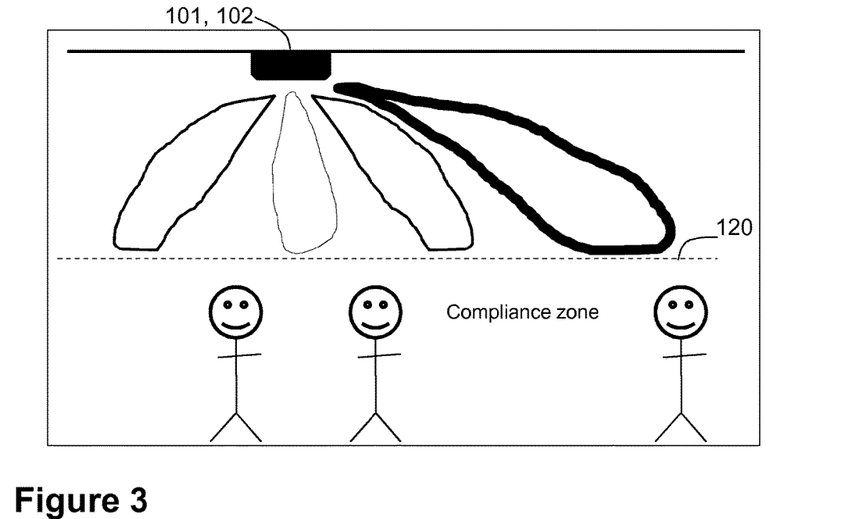
FIG. 3 is a schematic diagram illustrating a compliance zone and a ceiling mounted RBS, according to some embodiments.

An example of embodiments herein is shown in FIG. 3, where the first communication device 101 is the same as the second communication device 102, which is a ceiling mounted base station installed in an indoor environment at a height of 4 meters (m). It is expected that humans are not taller than 2.5 m. Then, when directing a beam emitted by the second communication device 102 straight down towards the floor, the power and/or beam shape may be set by the adjusting of Action 201, so that the exposure limit is not exceeded at a distance of 1.5 m from the ceiling, that is, in the zone 120. Compliance with limits on RF EMF exposure may therefore be obtained in the zone 120, which is the region accessible to the general public, and which is represented in the Figure as the volume below the dashed line. When directing a beam towards a receiver 50 m away, almost in parallel with the ceiling, a higher power may be used, such that the exposure limit is not exceeded at a distance of 50 m. The transmitted power level is indicated in FIG. 3 with the beam thickness.

Figure 4:
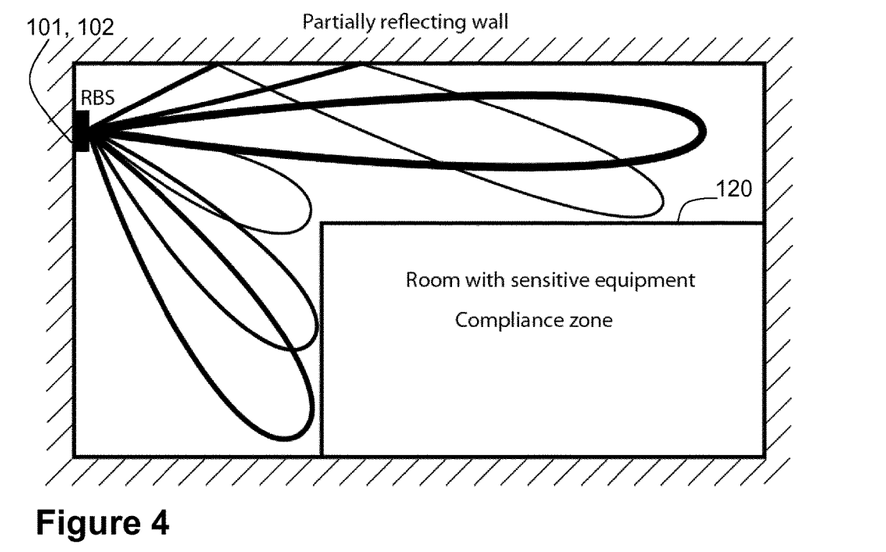
FIG. 4 is a schematic diagram illustrating a compliance zone and a wall mounted RBS, according to some embodiments.

Another example of embodiments herein is shown in FIG. 4, where the first communication device 101 is the same as the second communication device 102, which is a wall mounted RBS installed to provide coverage in an environment with sensitive equipment. The sensitive equipment is located in the zone 120, which in this example is a room. When directing beams emitted by the second communication device 102, either directly or indirectly via reflections, towards the zone 120, that is, the room/building with sensitive equipment, the power and/or beam shape may be set by the adjusting of Action 201, so that the electric field strength does not exceed the relevant EMC limit inside the pre-defined zone 120. The transmitted power level in FIG. 4 is indicated with the beam thickness.

Figure 5:
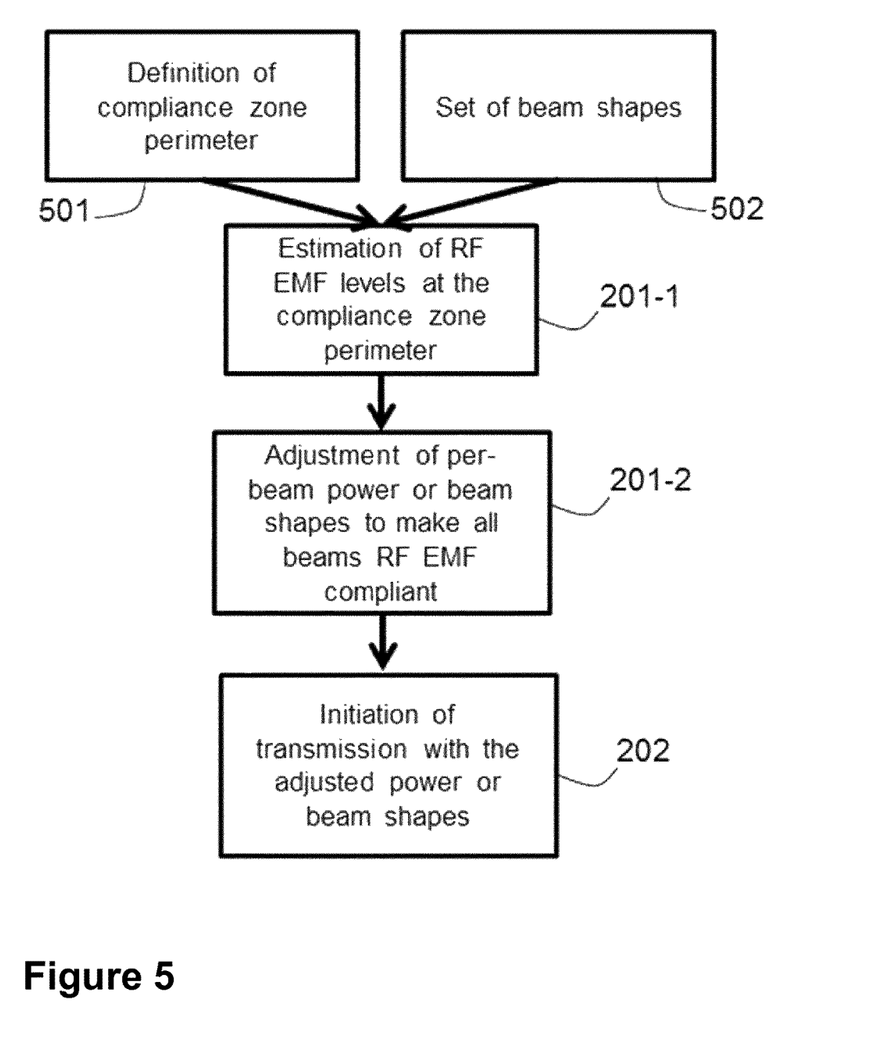
FIG. 5 is a schematic flowchart illustrating a non-limiting example of a method in a first communication device, according to some embodiments.

FIG. 5 illustrates a non-limiting example of the method according to embodiments herein. As part of the first action 201, the first communication device 101, based on a defined compliance zone perimeter 501, which may be understood as the perimeter of the compliance zone 120, and a set of beam shapes 502 of the second communication device 102, may obtain the determination of whether the radio frequency electromagnetic field strength (RF EMF) in the zone 120 for a desired set of beam shapes is below the threshold. This is done by estimating the RF EMF levels on the compliance zone 120 perimeter, as described in Action 201-1. Based on this obtained determination, in Action 201-2, the first communication device 101 adjusts the output power and/or beam shape, on a per-beam basis, to make the RF EMF in the zone 120 due to all the beams in the second communication device 102 compliant with the regulation. Finally, in Action 202, the first communication device 101 initiates transmission of the signal with the adjusted power or beam shapes.

To summarize the foregoing in other words, according to the method described for the first communication device 101, the first communication device 101 may control the transmit power and/or the antenna diagram based on a pre-defined compliance zone 120 in which the RF EMF levels are required to be below certain limit values. This may be achieved via the use of a beamforming processor that may adjust the shape and/or power of all possible beams such that the RF EMF levels inside the compliance zone 120 are below the predefined limits, e.g., set by the regulation.

One benefit of the embodiments herein is that they allow greater freedom in deployment of RBS by ensuring that the RF EMF levels are below relevant limits in certain areas where restrictions on said levels may apply. Installation locations which would be unavailable a general, that is, non-site specific, compliance boundary may now be used, according to the embodiments herein.

Another benefit of the embodiments herein is that the coverage may be improved by enabling higher power to be transmitted in certain directions using beamforming.

Another benefit of the embodiments herein is that they are transparent to the third communication device 103, e.g., a UE. This is because the embodiments herein will be compliant with existing wireless standards through the use of a codebook design for multi-antenna beamforming and spatial multiplexing. This ensures that the wireless devices in the wireless communications network 100, such as the third communication device 103, may rely on the transmitted reference symbols for estimating the beamforming gain of a particular precoder without requiring configuration changes in the wireless devices.

To perform the method actions described above in relation to FIGS. 2 and/or 5, the first communication device 101 is configured to manage beamforming configured to be used by the second communication device 102 for transmission of the signal. The first communication device 101 comprises the following arrangement depicted in FIG. 6. As already mentioned, the first communication device 101 and the second communication device 102 are configured to operate in the wireless communications network 100 comprising the zone 120 wherein the radio frequency electromagnetic field strength is required by the regulation to be below the threshold.

Figure 6:
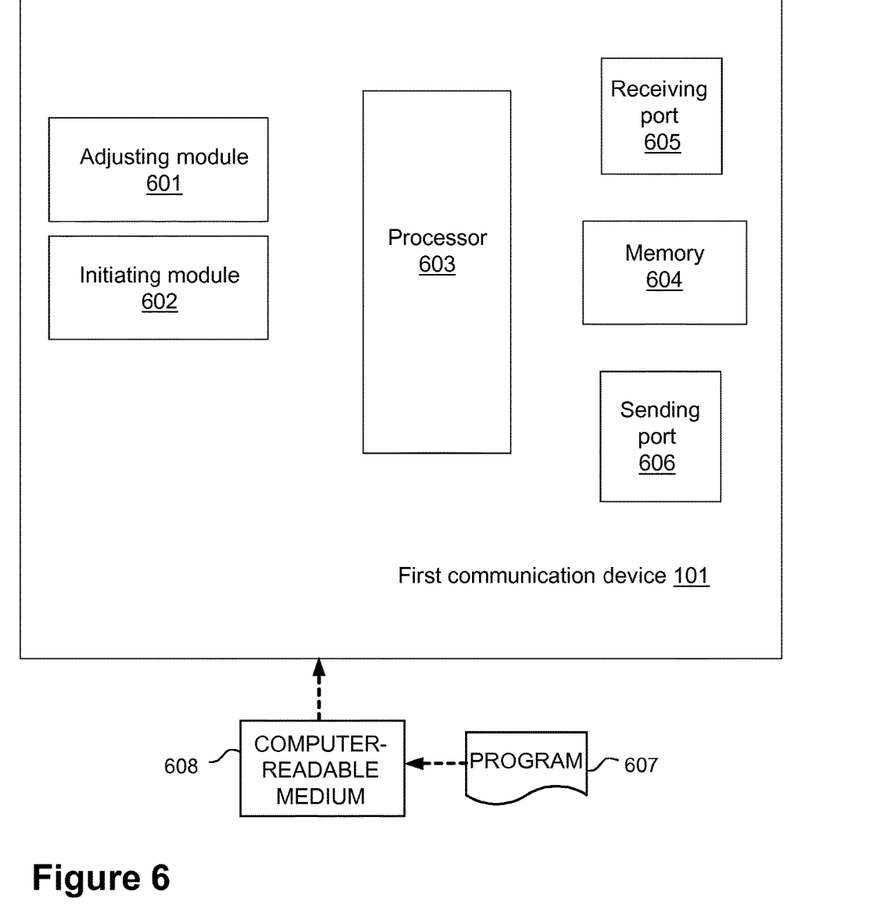
FIG. 6 is a block diagram illustrating embodiments of a first communication device, according to some embodiments.

The detailed description of some of the following corresponds to the same references provided above, in relation to the actions described for the first communication device 101, and will thus not be repeated here. For example, the signal may be understood herein as a radio signal.

The first communication device 101 is configured to, e.g., by means of an adjusting module 601 configured to, adjust at least one of: output power and beam shape in the beamforming configured to be used, wherein to adjust is configured to be such that the radio frequency electromagnetic field strength in the zone 120 for the output power and the beam shape in the beamforming is below the threshold.

The adjusting module 601 may be a processor 603 of the first communication device 101.

In some embodiments, to adjust may be configured to be performed based on one of: a) the look-up table comprising a finite set of weights, and b) the certain antenna weight vector and corresponding output power.

The radio frequency electromagnetic field strength may be configured to be averaged over the time period.

In some embodiments, the zone 120 may be a) pre-configured or b) configured to be estimated by the first communication device 101 based on sensor input.

In some embodiments, to adjust may be configured to be performed based on the obtained update of the dimension of the zone 120.

The update of the dimension of the zone 120 may be configured to be obtained by receiving the message from another communication device in the wireless communications network 100.

In some embodiments, the adjusting 202 may be performed by sending the message to the second communication device 102, the message comprising the indication on how to perform the adjustment.

The first communication device 101 is further configured to, e.g., by means of an initiating module 602 configured to, initiate transmission of the signal to the third communication device 103 configured to operate in the wireless communications network 100 using beamforming with the adjusted at least one of: output power and beam shape.

The initiating module 602 may be the processor 603 of the first communication device 101.

The embodiments herein to manage beamforming configured to be used by the second communication device 102 for transmission of the signal may be implemented through one or more processors, such as the processor 603 in the first communication device 101 depicted in FIG. 6, together with computer program code for performing the functions and actions of the embodiments herein. The program code mentioned above may also be provided as a computer program product, for instance in the form of a data carrier carrying computer program code for performing the embodiments herein when being loaded into the in the first communication device 101. One such carrier may be in the form of a CD ROM disc. It is however feasible with other data carriers such as a memory stick. The computer program code may furthermore be provided as pure program code on a server and downloaded to the first communication device 101. The computer program code may also be provided as a service from the cloud. As indicated above, the processor 603 may comprise one or more circuits, which may also be referred to as one or more modules in some embodiments, each configured to perform the actions carried out by the first communication device 101, as described above in reference to FIG. 6, e.g., the adjusting module 601, and the initiating module 602. Hence, in some embodiments, the adjusting module 601, and the initiating module 602 described above may be implemented as one or more applications running on one or more processors such as the processor 603. That is, the methods according to the embodiments described herein for the first communication device 101 may be respectively implemented by means of a computer program 607 product, comprising instructions, i.e., software code portions, which, when executed on at least one processor 603, cause the at least one processor 603 to carry out the actions described herein, as performed by the first communication device 101. The computer program 607 product may be stored on a computer-readable storage medium 608. The computer-readable storage medium 608, having stored thereon the computer program 607, may comprise instructions which, when executed on at least one processor 603, cause the at least one processor 603 to carry out the actions described herein, as performed by the first communication device 101. In some embodiments, the computer-readable storage medium 608 may be a non-transitory computer-readable storage medium, such as a CD ROM disc, a memory stick, or stored in the cloud space. In other embodiments, the computer program 607 product may be stored on a carrier containing the computer program, wherein the carrier is one of an electronic signal, optical signal, radio signal, or the computer-readable storage medium 608, as described above.

The first communication device 101 may further comprise a memory 604 comprising one or more memory units. The memory 604 may be arranged to be used to store obtained information, such as the information received by the processor 603, store data configurations, scheduling, and applications etc. to perform the methods herein when being executed in the first communication device 101. The memory 604 may be in communication with the processor 603. Any of the other information processed by the processor 603 may also be stored in the memory 604.

In some embodiments, information e.g., from the second communication device 102 or the third communication device 103, may be received through a receiving port 605. The receiving port 605 may be in communication with the processor 603. The receiving port 605 may also be configured to receive other information.

The processor 603 may be further configured to send messages, e.g., to second communication device 102 or the third communication device 103, through a sending port 606, which may be in communication with the processor 603, and the memory 604.

Those skilled in the art will also appreciate that the any module within the first communication device 101, e.g., the adjusting module 601, and the initiating module 602 described above, may refer to a combination of analog and digital circuits, and/or one or more processors such as the processor 603 configured with software and/or firmware, e.g. stored in the memory 604, that when executed by the one or more processors such as the processor 603, perform actions as described above, in relation to FIGS. 2 and/or 5. One or more of these processors, as well as the other digital hardware, may be included in a single application-specific integrated circuitry (ASIC), or several processors and various digital hardware may be distributed among several separate components, whether individually packaged or assembled into a system-on-a-chip (SoC).

When using the word "comprise" or "comprising" it shall be interpreted as non-limiting, i.e. meaning "consist at least of".

The embodiments herein are not limited to the above described preferred embodiments. Various alternatives, modifications and equivalents may be used. Therefore, the above embodiments should not be taken as limiting the scope of the invention.

REFERENCES

[1] ICNIRP, "Guidelines for limiting exposure to time-varying electric, magnetic, and electromagnetic fields (up to 300 GHz)", International Commission on Non-Ionizing Radiation Protection (ICNIRP), Health Physics, vol. 74, pp 494-522, April 1998.
[2] Council Recommendation 1999/519/EC of 12 Jul. 1999 on the limitation of exposure of the general public to electromagnetic fields (0 HZ to 300 GHz), Official Journal L 197 of 30 Jul. 1999.
[3] CENELEC EN 50400, Basic standard to demonstrate the compliance of fixed equipment for radio transmission (110 MHz-40 GHz) intended for use in wireless telecommunication networks with the basic restrictions or the reference levels related to general public exposure to radio frequency electromagnetic fields, when put into service, June 2006.
[4] IEC 62232, Determination of RF field strength and SAR in the vicinity of radio communication base stations for the purpose of evaluating human exposure, May 2011.
[5] Prasad, M "Smart radiation protection system for wireless mobile device to reduce specific absorption rate (SAR)" Patent IN201302862P4.
[6] Chen P F, Harel H, Kludt K "System and method for adaptive beamforming for specific absorption rate control" Patent U.S. Pat. No. 8,630,596B2.

The invention claimed is:
1. A method performed by a first communication device for managing beamforming by a second communication device for transmission of a signal, the first communication device and the second communication device operating in a wireless communications network comprising a zone in which a radio frequency electromagnetic field strength is required by a regulation to be below a threshold, the method comprising:
adjusting at least one beam shape in the beamforming, the adjusting of the at least one beam shape being such that the radio frequency electromagnetic field strength in the zone for an output power and the beam shape in the beamforming is below the threshold, the adjusting of the at least one beam shape being based at least in part on at least one reflection of at least one beam; and
initiating transmission of the signal to a third communication device operating in the wireless communications network using beamforming with the adjusted at least one beam shape.
2. The method according to claim 1, wherein the adjusting is performed based on one of: a) a look-up table comprising a finite set of weights, and b) a certain antenna weight vector and corresponding output power.
3. The method according to claim 2, wherein the radio frequency electromagnetic field strength is averaged over a time period.

4. The method according to claim 2, wherein the adjusting is performed based on an obtained update of a dimension of the zone.

5. The method according to claim 2, wherein the adjusting is performed by sending a message to the second communication device, the message comprising an instruction for how to perform the adjustment.

6. The method according to claim 1, wherein the radio frequency electromagnetic field strength is averaged over a time period.

7. The method according to claim 1, wherein the adjusting is performed based on an obtained update of a dimension of the zone.

8. The method according to claim 7, wherein the update of the dimension of the zone is obtained by receiving a message from another communication device in the wireless communications network.

9. The method according to claim 1, wherein the adjusting is performed by sending a message to the second communication device, the message comprising an instruction for how to perform the adjustment.

10. The method according to claim 1, wherein the zone is one of a) pre-configured and b) estimated by the first communication device based on sensor input.

11. A non-transitory computer-readable storage medium, having stored thereon a computer program, comprising instructions which, when executed on at least one processor, cause the at least one processor to perform a method by a first communication device for managing beamforming by a second communication device for transmission of a signal, the first communication device and the second communication device operating in a wireless communications network comprising a zone in which a radio frequency electromagnetic field strength is required by a regulation to be below a threshold, the method comprising:
adjusting at least one beam shape in the beamforming, the adjusting of the at least one beam shape being such that the radio frequency electromagnetic field strength in the zone for an output power and the beam shape in the beamforming is below the threshold, the adjusting of the at least one beam shape being based at least in part on at least one reflection of at least one beam; and
initiating transmission of the signal to a third communication device operating in the wireless communications network using beamforming with the adjusted at least one beam shape.

12. A first communication device configured to manage beamforming configured to be used by a second communication device for transmission of a signal, the first communication device and the second communication device being configured to operate in a wireless communications network comprising a zone in which a radio frequency electromagnetic field strength is required by a regulation to be below a threshold, the first communication device being further configured to:
adjust at least one beam shape in the beamforming configured to be used, the adjusting of the at least one beam shape being configured to be such that the radio frequency electromagnetic field strength in the zone for an output power and the beam shape in the beamforming is below the threshold, the adjusting of the at least one beam shape being based at least in part on at least one reflection of at least one beam; and
initiate transmission of the signal to a third communication device configured to operate in the wireless communications network using beamforming with the adjusted at least one beam shape.

13. The first communication device according to claim 12, wherein the adjusting is configured to be performed based on one of: a) on a look-up table comprising a finite set of weights, and b) a certain antenna weight vector and corresponding output power.

14. The first communication device according to claim 13, wherein the radio frequency electromagnetic field strength is configured to be averaged over a time period.

15. The first communication device according to claim 13, wherein the adjusting is configured to be performed based on an obtained update of a dimension of the zone.

16. The first communication device according to claim 12, wherein the radio frequency electromagnetic field strength is configured to be averaged over a time period.

17. The first communication device according to claim 12, wherein the adjusting is configured to be performed based on an obtained update of a dimension of the zone.

18. The first communication device according to claim 17, wherein the update of the dimension of the zone is configured to be obtained by receiving a message from another communication device in the wireless communications network.

19. The first communication device according to claim 12, wherein the adjusting is configured to be performed by sending a message to the second communication device, the message comprising an instruction for how to perform the adjustment.

20. The first communication device according to claim 12, wherein the zone is one of a) pre-configured and b) configured to be estimated by the first communication device based on sensor input.

* * * * *